(12) United States Patent  
Chapman

(10) Patent No.: US 8,337,150 B2
(45) Date of Patent: Dec. 25, 2012

(54) VERTICAL AXIS WIND TURBINE APPARATUS

(76) Inventor: Malcolm G. Chapman, Middletown, CT (US)

( * ) Notice: Subject to any disclaimer, the term of this patent is extended or adjusted under 35 U.S.C. 154(b) by 727 days.

(21) Appl. No.: 12/577,167

(22) Filed: Oct. 10, 2009

(65) Prior Publication Data

US 2011/0085909 A1    Apr. 14, 2011

(51) Int. Cl.
    *F03D 11/02* (2006.01)
(52) U.S. Cl. ............. 415/124.1; 416/DIG. 4; 416/170 R
(58) Field of Classification Search .................... 415/2.1, 415/3.1, 4.1, 4.2, 4.3, 4.4, 4.5, 124.1, 905, 415/907, 908; 416/51, 52, DIG. 4, 170 R
See application file for complete search history.

(56) References Cited

U.S. PATENT DOCUMENTS

| 4,446,379 A * | 5/1984 | Borg et al. ........................ 290/55 |
| 4,464,579 A * | 8/1984 | Schwarz ........................ 290/44 |
| 4,832,569 A * | 5/1989 | Samuelsen et al. ............. 416/17 |
| 5,302,084 A * | 4/1994 | Nelson ............................ 416/17 |
| 6,648,589 B2 * | 11/2003 | Williams ........................ 415/1 |
| 7,303,369 B2 * | 12/2007 | Rowan et al. .................. 415/4.2 |
| 2009/0169354 A1 * | 7/2009 | Kelaiditis et al. .............. 415/4.2 |

* cited by examiner

*Primary Examiner* — Richard Edgar
*Assistant Examiner* — Ryan Ellis
(74) *Attorney, Agent, or Firm* — Robert S. Smith

(57) ABSTRACT

A vertical axis wind turbine apparatus includes a stationary support platform having a platform pipe fixed to the platform. The platform pipe has an axis. The apparatus also includes a power ring dimensioned and configured for rotational movement about the platform pipe and having an axis of rotation coincident with the axis of the platform pipe. The power ring includes a sleeve concentric with the platform pipe that has a plurality openings therein. A plurality of rollers is carried on the power ring and each of the rollers extends through one of the openings and abuts the platform pipe thereby facilitating rotation of the power ring about the platform pipe. A plurality of elongated blades is carried on the power ring about the periphery thereof.

13 Claims, 5 Drawing Sheets

VERTICAL AXIS WIND TURBINE APPARATUS

FIELD OF THE INVENTION

The invention has particular application to methods and apparatus for harvesting wind energy to produce electric power. More particularly, the apparatus that typically has a vertical axis of rotation and a rotor that is generally cylindrical.

The market for such products includes ships at sea and in port. Large sizes of such apparatus are suitable for utility companies and are suitable to be mounted on a base in close proximity to established power transmission towers. Such installations utilize the same land and access roads with direct connection to their established power line grid and thus eliminating the cost of building new grid infrastructure from wind driven areas. Mid sizes of such apparatus are suitable for hospitals, schools, offices and other commercial buildings where they may be connected to the buildings own power grid. Smaller sizes of such apparatus are suitable for ships at sea and in port, private homes. Portable units are suitable for the military operating in hostile environments and scientists operating in isolated hard to reach communities where fuel is delivery is difficult.

BACKGROUND OF THE INVENTION

Worldwide interest in renewable energy options has given rise to a rash of new wind turbine designs. Some of the most recent models on the market are vertical axis wind turbines (VAWTs) that are quiet, efficient, economical and perfect for residential energy production, especially in urban environments.

The prior art includes two vertical axis wind turbine (VAWT) designs. One form of the Savonius rotor can be visualized as a 55-gallon drum and cut it in half along a plane passing through the geometric axis of the drum which bisects the drum. Then the two halves of the drum are mounted on a shaft that rotates in a manner similar to an anemometer.

Another form is the Darrieus apparatus that resembles an egg beater. Essentially, it has two vertically oriented blades revolving around a vertical shaft. The blades are airfoils. These airfoils, like airplane wings, have a flat side and a curved side. The result of air passing over the two sides is a force known as lift. Because the airfoils are secured to a hub, which in turn is attached to a generator shaft the air passing over the airfoil shaped blades produces rotational movement which spins the generator.

SUMMARY OF THE INVENTION

It is an object of the present invention to provide apparatus and a method suitable for installation and use in a variety of worldwide locations including but not limited to North America, South America, the African continent, Europe, United Kingdom, Australia, Russia, China, and all Asian and Arab countries. As a standalone power option, or as a supplemental power source to aid old over worked power generation plants that are reportedly failing on a daily basis.

Another object of the present invention to provide an apparatus and a method suitable both for large scale power grids as well as substantially independent power consumers such as remote Islands and isolated interiors of large continents.

An additional object of the present is to reduce the carbon footprint of diesel electric power generation equipment used worldwide on ships at sea and in port.

It is now been found that these and other objects of the present invention may be achieved in a vertical axis wind turbine apparatus which includes a stationary support platform having a platform pipe fixed to the platform. The platform pipe has an axis. The apparatus also includes a power ring dimensioned and configured for rotational movement about the platform pipe and having an axis of rotation coincident with the axis of the platform pipe. The power ring includes a sleeve concentric with the platform pipe that has a plurality openings therein. A plurality of rollers is carried on the power ring and each of the rollers extends through one of the openings and abuts the platform pipe thereby facilitating rotation of the power ring about the platform pipe. A plurality of elongated blades is carried on the power ring about the periphery thereof.

In some forms of the apparatus each of the blades are disposed in substantially aligned relationship with the axis of the platform pipe. Each of the blades may have a generally Z-shape cross-section and may have a generally planar midsection having opposed flanges extending from the generally planar midsection to define the Z-shaped cross-section. The contour of the sides of the midsection of respective blades at the interface with the respective flanges thereof may be substantially elliptical sections. The face of each blade facing the wind may have a matte finish.

In some forms of the apparatus the sleeve on the power ring may include a drive surface disposed on the upper face thereof and the drive surface may be dimensioned and configured for engagement with the rotor of at least one power generation apparatus. The apparatus may further include at least a first generator having a drive wheel dimensioned and configured for engaging the drive surface on the sleeve although other embodiments may have a plurality of generators having respective drive wheels dimensioned and configured for engaging the drive surface on the sleeve. Some embodiments may include apparatus for sequentially engaging respective generators with the drive surface on the upper face of the sleeve as part of a startup sequence during which the power ring begins rotary motion and progresses to a stable operating speed. Some embodiments may also include alternator having a drive wheel dimensioned configured for engaging the drive surface of the sleeve.

Some embodiments have a power ring that includes a plurality of electromagnets disposed thereon and the apparatus further includes a plurality of permanent magnets on stationary structure dimensioned, configured and positioned for registration with respective electromagnets as the power ring rotates. The vertical axis wind turbine apparatus may further include a voltage regulator and a pulse width modulator conditioning the output of the alternator and sequentially directing that output to respective electromagnets on the power ring whereby rotational movement of the power ring is augmented.

BRIEF DESCRIPTION OF THE DRAWING

The invention will be better understood by reference to the accompanying drawing in which.

DESCRIPTION OF THE PREFERRED EMBODIMENTS

Figure 1:
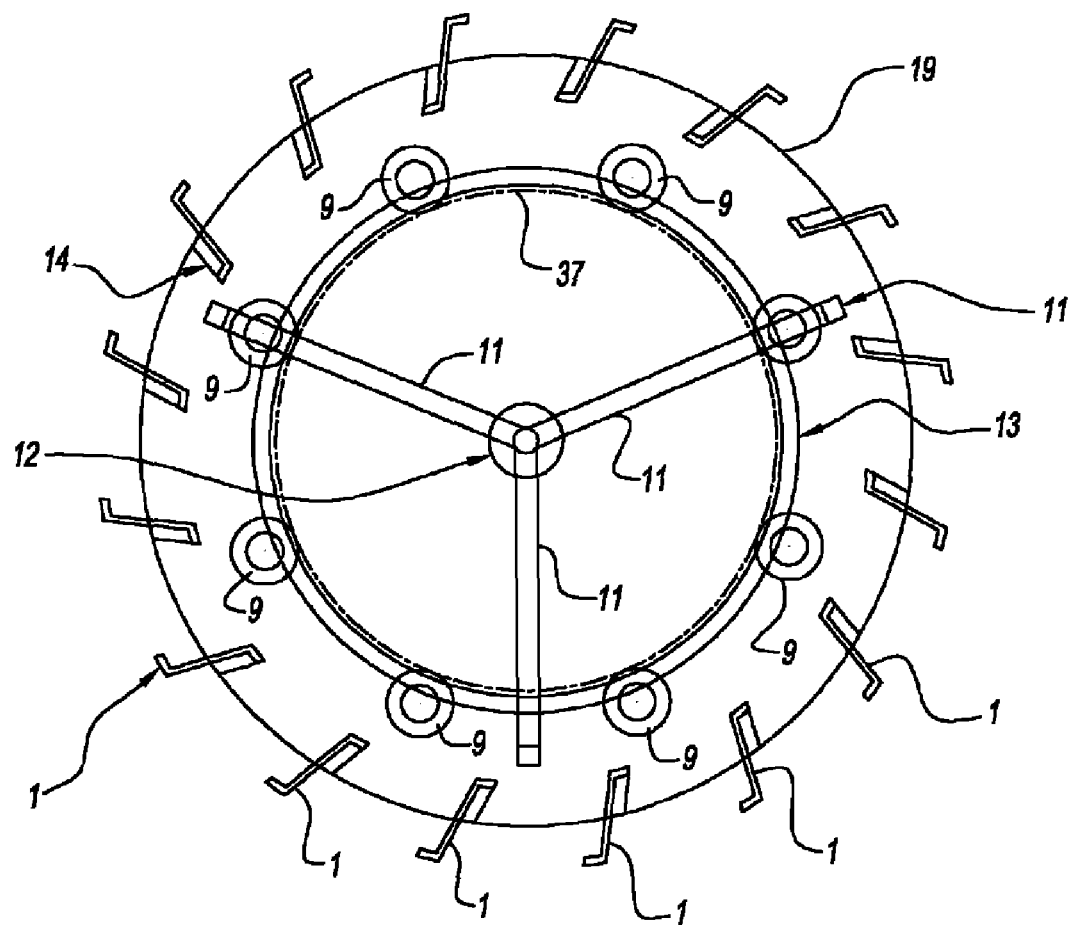
FIG. 1 is a partially schematic plan view of a preferred form of the overall apparatus.
Figure 2:
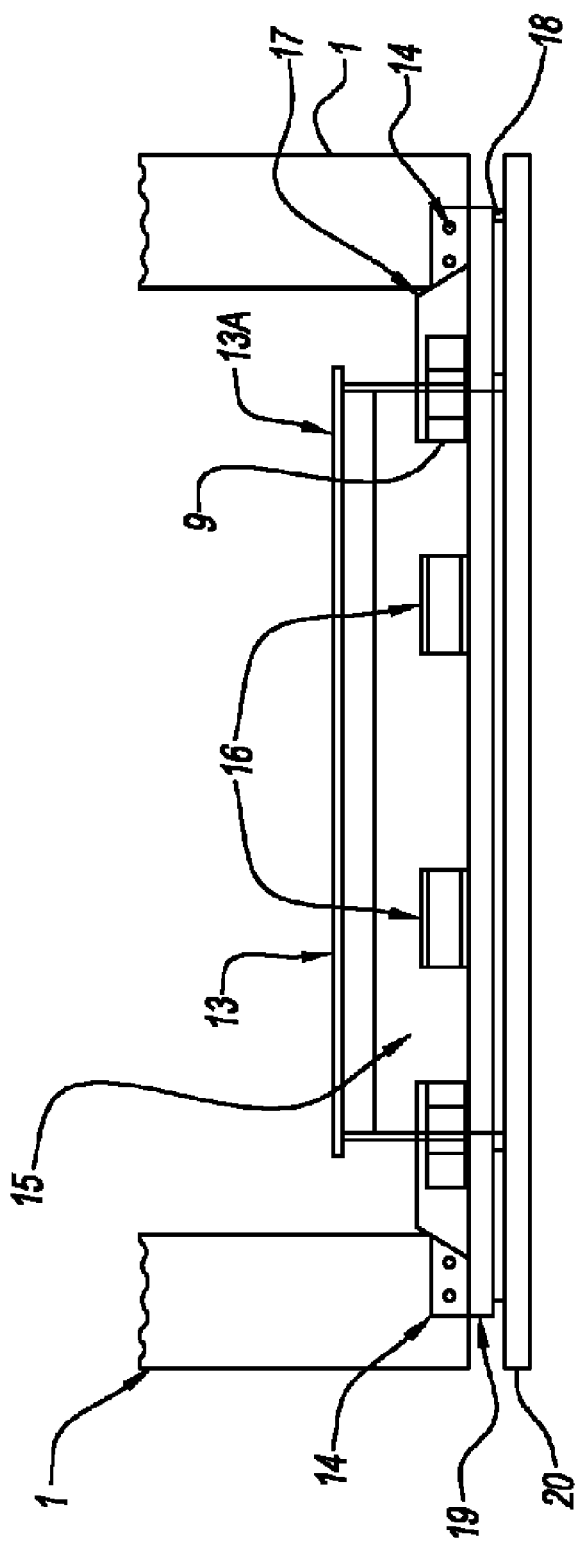
FIG. 2 is a partially schematic, fragmentary, simplified, side elevation view of the apparatus shown in FIG. 1.
Figure 5:
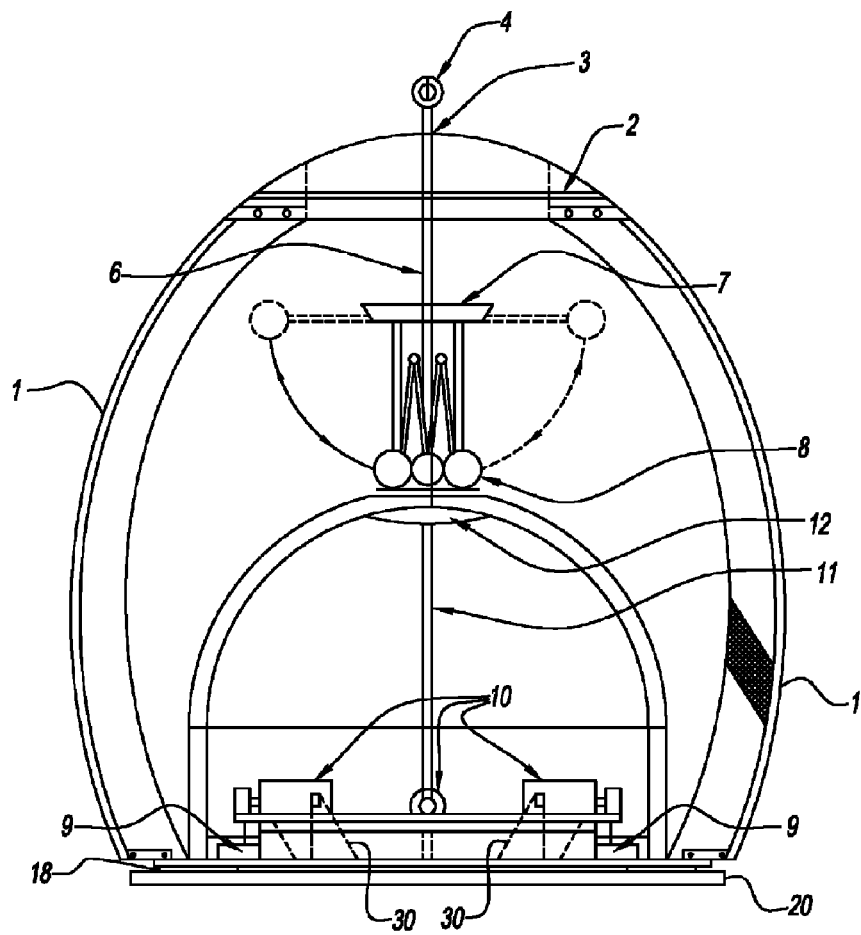
FIG. 5 is a partially schematic side elevation view of the dome that is supported on the power ring and is a part of the overall apparatus shown in FIG. 1.

The apparatus in a preferred embodiment includes a vertical axis turbine. As best seen in FIGS. 1, 2 and 5 a stationary platform 20 supports the rest of the apparatus. Fixed to the stationary platform 20 is a platform pipe 37. The platform pipe 37 is an axis or spindle for the rotating portions of the apparatus. The stationary platform 20 includes a circular area (not shown) centered on the geometric centerline of the platform pipe 37. The circular area includes a plurality of elongated grooves (not shown) disposed in aligned relationship with respective radial lines from the geometric center line of the platform pipe 37. The grooves are disposed at equal angular positions about the geometric centerline of the apparatus and are dimensioned and configured for receiving respective rollers 18. The rollers 18 are roller bearings supporting the rotating structure of the apparatus including the power ring assembly 13.

The rotating parts of the apparatus include a plurality of Z shaped blades 1 mounted uniformly about the circumference of the power ring base 19 as best seen in FIGS. 1 and 5. The power ring base 19 is an annular plate shaped member having a circular opening therein that is concentric with respect to the outside circular edge thereof. The circular outer contour and the circular opening are concentric and have the geometric centers thereof coincident with the geometric centerline of the platform pipe 37 in the preferred embodiment. The rollers 18 (carried in the platform 20) also engage grooves (not shown) disposed in the bottom of the power ring base 19 and support the power ring base 19 in a manner to allow easy rotational movement of the power ring base 19. (Alternate embodiments may use magnetic levitation to support the power ring base 19.)

Figure 4:
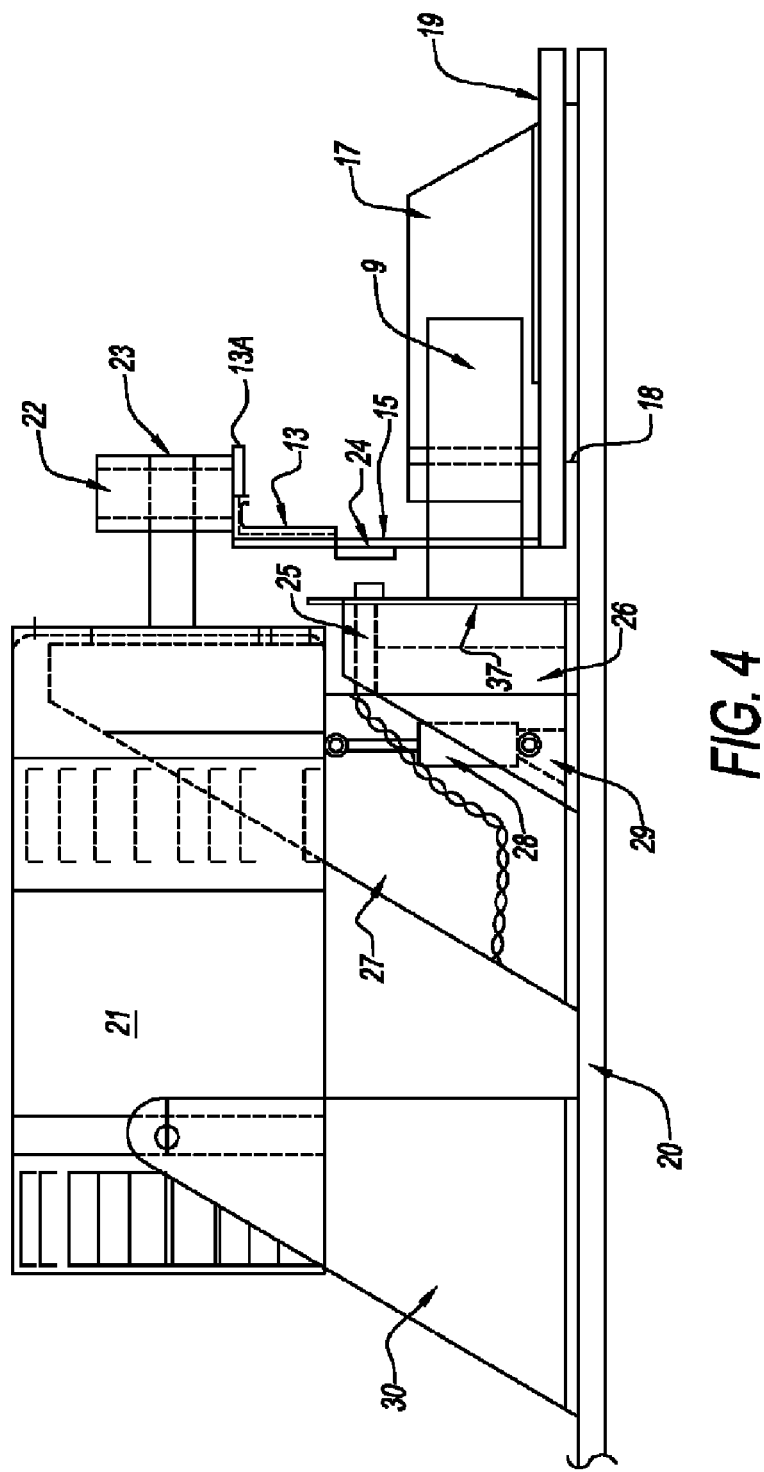
FIG. 4 is a partially schematic fragmentary side elevation view of the outboard part of the power ring that is a part of the overall apparatus shown in FIG. 1.

The power ring base 19 is part of cylindrical power ring assembly 13. The axis of the power ring assembly 13 is coincident with the axis of the platform pipe 37. As best seen in FIG. 2 the upper axial extremity of the center pipe 15 (that is part of the power ring assembly 13) is provided with a lip 13A extending radially away from the geometric center line of the power ring. As best seen in FIG. 1 the power ring assembly 13 is concentric with the platform pipe 37 and of larger diameter than the platform pipe 37. A plurality of roller assemblies 17 are mounted on the power ring base 19 as best seen in FIGS. 1, 2 and 4. Each roller assembly 17 includes a roller wheel 9. The power ring assembly 13 includes eight openings 16 disposed at equal angular positions about the circumference of the center pipe 15. The openings 16 are provided to allow access of the respective high speed roller wheels 9 of the respective roller assemblies 17 through the power ring assembly 13 so that the roller wheels 9 engage the outer wall of the stationary platform pipe 37 to enable easy rotation of the power ring assembly 13, (including the power ring base 19, as well as the roller assemblies 17) about the platform pipe 37. Accordingly, each roller wheel 9 extends through one of the respective openings 16 in the center pipe 15 (that is also a part of the power ring assembly 13) to engage the outer face of the platform pipe 37.

Figure 3:
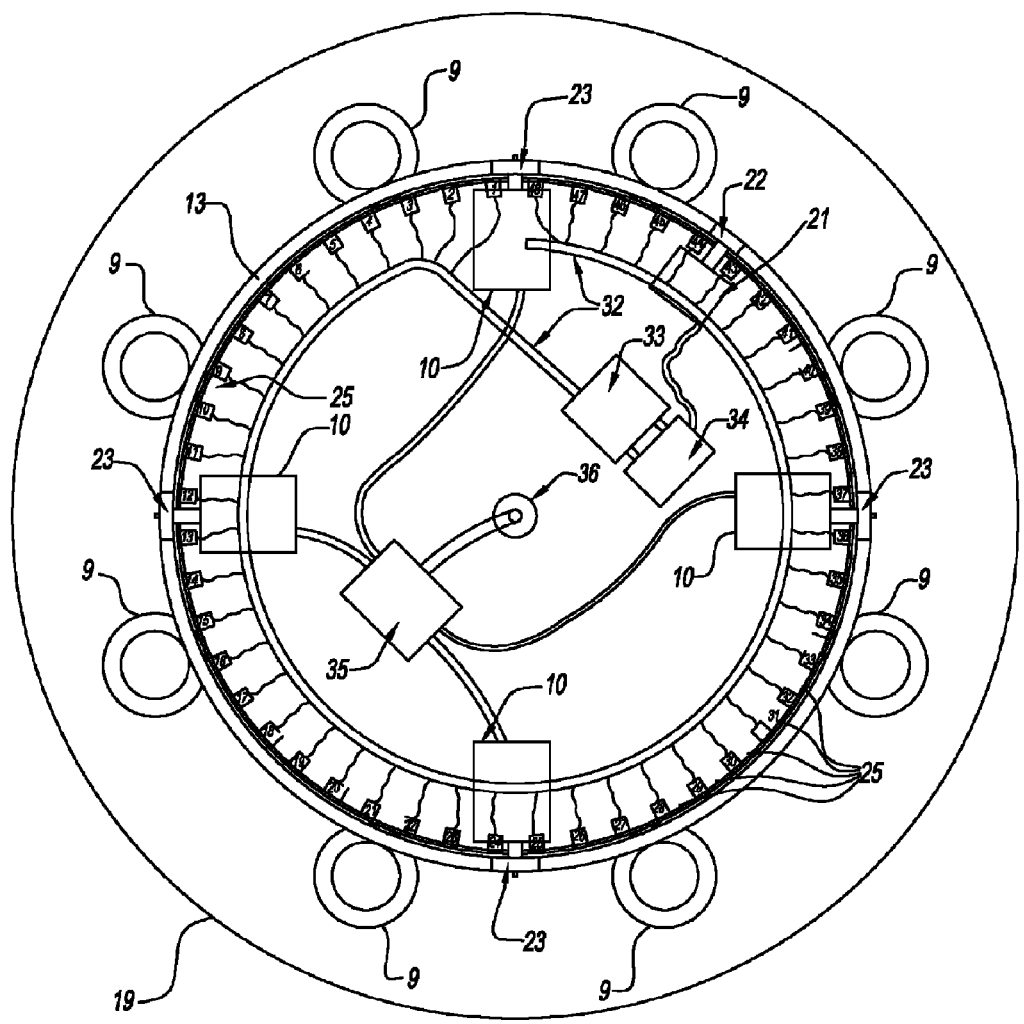
FIG. 3 is a partially schematic plan view of the stationary platform that supports the power ring assembly (shown other figures) that is a part of the overall apparatus shown in FIG. 1.

Mounted on the platform 20 are four generators 10 as best seen in FIG. 3. Each generator 10 includes a drive wheel 23.

Each generator 10 is supported by triangular brackets 27, 30 that are fixed to the platform 20 and positioned for engagement between the respective drive wheels 23 and a lip 13A of the power ring assembly 13. Preferred embodiments of the present invention rely on frictional engagement between the lip 13A and the respective drive wheels 23. In illustrated preferred embodiment there are four generators successfully positioned at 90° about the circular extent of the lip 13A. Other embodiments of the present invention may utilize a bevel gear interface for the drive wheels. The output of the respective generators 10 is directed sequentially to an outgoing generated energy junction box 35 and outgoing power cable and plug outlet 36.

A preferred embodiment of the present invention includes a 100 w 12 volt alternator 21 that is also supported on the platform 20 in the same general manner as the generators 10. Also on the same general manner as the generators 10, the alternator 21 includes a drive wheel 22 that engages the lip 13A. Unlike the generators 10, the drive wheel 22 engages the lip 13A at all times. In other words, the drive wheel 22 is not raised and lowered during the operating process in the general manner as that used for the generators 10. The output of the alternator 21 is supplied to a regulator 34 that includes, a 12 V DC regulator sequentially connected to a mag pulse width modulator. The output of that regulator 34 is fed by a cable to a mag pulse distribution box 33 and then into a pulse distribution harness 32 and then into respective positive electromagnetic assemblies 25. The electromagnet assemblies 25 cooperate with respective permanent magnets 24 attached to the center pipe 15 to be described hereafter. Some embodiments include respective light emitting diodes associated with each electromagnet assembly 25 to provide a visual display for each electromagnet assembly to indicate when the electromagnet assembly 25 is energized.

As best seen in FIGS. 1 and 5, three supports 11 are welded at 60° angles to the power ring base 19 at the lower axial extremity thereof and to a support plate 12 at the upper axial extremities thereof. In a preferred embodiment of the invention the supports 11 are manufactured from square tubing. As best seen in FIG. 5 support plate 12 is welded to a support pipe 6 that extends vertically through the dish dome 3. A weld (not shown) fixes the dish dome 3 to the support pipe 6. The upper axial extremity of the support pipe 6 includes a lifting eye 4 for allowing a hoist (not shown) to move the entire assembly. As best shown in FIG. 5, a centrifugal ball assembly 7 (that includes three balls 8) is fixed to the support pipe 6. As the rotor revolves, the support pipe 6 also revolves causing the balls 8 to move up and out from the support pipe 6. This movement increases the inertia of the rotor and thereby causes the power ring assembly 13 to continue rotating after rotation has once begun.

The Z-shaped blades 1 are fixed around the periphery of the power ring assembly 13 as best seen in FIG. 1. As shown in FIG. 2 the lower axial extremity of each blade 1 is fixed to the power ring assembly 13 by a retaining angle 14. In a similar manner the upper axial extremity of each blade 1 is fixed to the dish dome 3.

The following will describe certain aspects of the above apparatus in greater detail. The Z-shaped blades 1 have a preferred cross-section, shown in FIG. 1 that includes a planar midsection joining to parallel planar extremities or flanges that are disposed in oblique relationship to the midsection. The blades 1 are made from non-corrosive marine 5086 aluminum of ⅛ inch thickness by 6 feet 9¾ inches tall, 12 inch wide, plasma cut with opposed sides that are substantially elliptical section shape, stiffened and rolled with one inch wide flanges disposed at an angle of substantially one hundred degrees to the body of the blade as best shown in FIG. 1. As shown in FIG. 1 the flanges are disposed on the longitudinal sides of each blade and are rolled in opposite directions to form a Z shaped cross section. The term "substantially elliptical section shape" will be understood to mean that opposed sides of the blades have portions of the blades that have contours that are substantially the contour of a section of an ellipse. In the preferred embodiment the contour of the intersection between (1) the respective flanges extending from the main body of the blade and (2) the main body of the blade is generally elliptical as best seen in FIG. 5.

The side of the blades 1, facing the wind, have a matte finish in order to increase the capture of the energy in the wind that impacts the blade 1. More specifically, a gloss finish would deflect the energy of the wind and thus is less desirable A preferred embodiment of the present invention will include various more specific aspect. For example, the bottom of each blade 1 is secured by two bolts through an aluminum Retaining angle 14 welded to the ⅝ inch×6 ft diameter power ring base 19. The top of the blades 1 are secured by two bolts through 5086⅛ inch aluminum gussets 5 welded to the ⅛ inch dish dome 3 to the support pipe 6 at the same 22% angle with respect to radial lines from the geometric center of the power ring 13 as the bottom angles. The blades 1 are uniformly spaced from the center of the power ring 13 as well as uniformly spaced about the periphery of the power ring 13.

The power ring base 19 is manufactured by starting with a 6 ft outside diameter flat circle of ⅝ inch 5086 marine aluminum sheet stock. The power ring base 19 is an annular plate with a inner bore or hole to which is attached a center pipe 15 having a length of 12 inches. The center pipe 15 is 6¾ inch×⅜ inch 5086 aluminum pipe and is welded to the edge of the bore of the power ring base 19. The center pipe 15 has eight equally spaced 6 inch×3 inch plasma cut roller wheel access holes 16. The holes 16 accommodate eight equally spaced about the circumference of high speed self lubricating heavy duty 6 inch×2 inch roller wheels 9. These roller wheels 9 are held in place by eight adjustable roller wheel assemblies 17 that are welded to the power ring base 19.

Disposed on the top of the center pipe 15 is a 3 inch×2 inch×⅜ inch rolled 5086 aluminum flange or lip 13A having a 2 inch height and the 3 inch horizontal facing. The lip 13A is welded flush with the top of the center pipe 15. The lip 13A engages the alternator wheel 22 and the four generator drive wheels 23. Disposed 2¾ inches down from the top of the center pipe 15 on the inner bore thereof (opposite side of the 2×3×⅜ angle) are 49 rare earth magnets 24 attached to the center pipe 15.

The power ring assembly has three equally spaced 2 inch×2 inch×¼ inch square tubing centrifuge supports 11. These supports 11 are welded to the ⅝ inch thick power ring base 19, rolled to meet in the center of the power ring assembly 13 at a point 36 inches above the power base 19 where they are welded to a ½ inch×6 inches support plate 12. The support pipe 6 is welded in the middle of the support plate 12 and extends vertically at the center of the power ring assembly 13 to a weld 3 at the top of the 10 inch deep×4 ft wide dish dome 3. On the top of the support pipe 6 is a welded a ⅝ inch eye bolt 4. Welded to the support pipe 6 at 18 inches high from the ½ inch×6 inch support plate 12, are three ⅛ 1×½×1×6 inch long U channel hanger supports for attachment by bolts and locking nuts for the centrifuge rod and balls and restrainers 7 that are welded at the same center line as the 2×2×¼ inch square tubing centrifuge supports 11.

A feature of embodiments of the invention is the alternator and electro magnetic pulse drive generator platform 20. This consists of the following: A 5086 marine aluminum plate measuring 6' ft×6' ft square×1 inch thick platform 20. Centered on the platform 20 is a 4 feet diameter spin area which is located below the power ring assembly 13. The spin area has eight uniformly spaced plasma cut center line slots of the size of 2×8 inch. 2 inches from both inner and outer edge of the spin area. Disposed within each of these slots is a high speed rollers of the size of 1½ inch×7½ 18 retained by screws through the mounting brackets on each end.

A circle having a diameter of 2 ft 11¼ inches centered on the generating platform 20 defines the location of the circumference of the platform pipe 37 having a height of 6 inches with a thickness of ½ inch and manufactured of 5086 marine aluminum. The platform pipe 37 is welded on the inside bottom to the platform 20. Welded to the inside of this platform pipe 37 and the bottom of the generator platform are 49 equally spaced 5×4×⅛ inch Mag pulse laser drive mounting brackets 26. From 1¼ inches down from the top of this platform pipe 37 are 49 equally spaced Plasma cut 3 inch vertical by 1 inch horizontal access holes to accommodate the electromagnet coil assemblies 25. The electromagnetic coil assemblies 25 cooperate with permanent magnets 24 mounted on the center pipe 15. Thus, the construction is consistent with that of a conventional stepper motor to be described hereafter. The apparatus also includes brackets 29 each supporting a tension snubber 28. Each tension snubber 28 is a 12 v electronic jack maintains frictional engagement between the alternator drive wheel 22 and the power ring lip 13A. Each snubber 28 is welded to the center line of one the four respective alternators 21. Two ³⁄₁₆ inch 5086 marine aluminum alternator mounting gussets or brackets 27 are welded to the generator platform 20. The four alternators 21 are equally spaced on the platform 20 and held in place by four gravity tip generator brackets of ½ inch 5086 marine aluminum brackets 30 welded to the generator platform. Disposed in the middle of the generating platform 20 is a 6 inch round plasma cut access hole for the outgoing generated power through a outgoing power cable and plug outlet 36.

After the generator has been mounted in the appropriate location, the stops will be taken out and the generators Z blades 1 will be free to react to the area breezes' and winds. As the power ring assembly 13 starts to spin, the centrifugal ball assembly 7 comes into play to add inertia to the spinning with its three spinning 5 lbs centrifuge balls 8. At this point the 100 watt 12 V alternator 21 starts to spin on the power ring assembly 13. This creates voltage output from the alternator 21 to the voltage regulator located inside the pulse width modulator micro processor and voltage regulator 34. Electric pulses then enter the magnetic pulse distributor box 33 causing pulses in the pulse distributor harness 32. These electronic pulses are then distributed from the harness by individual wire feeds 31 and then to the forty nine equally spaced equally spaced electromagnet assemblies 25 that now creates a positive electro magnetic-pulse laser drive. Small light emitting diodes are positioned next to each of the respective magnets to indicate the sequential application of electric power. Thus, each of the respective flashing light emitting diodes indicate a respective working pulse.

The opposing rare earth bar magnets 24. are mounted on the inside of the spinning vertical 6¾×⅜ inch 5086 aluminum center pipe 15 by a plastic retainer that covers the positive side of the rare earth magnets allowing the negative side to draw to the positive electro magnetic-pulse magnets without the drag of the repulsive magnetic flux from the positive side of the rare earth magnets.

As the Z-shaped blades harness wind power to spin the power ring assembly 13 along with the centrifugal ball assembly 7, the alternator 21 rotating as the result of rotation of the power ring assembly 13 starts to produce voltage, sending it through the Mag pulse drive system, causing the electro magnetic pulse drive to come into play without any outside electrical power source. As it gains speed to the equivalent of a 5 mph ambient wind a speed sensor sequentially activates the four low voltage generator tension snubbers electronic jacks 28. More specifically, as the speed sensor increases the four low drag variable speed direct drive generator wheels 10 are sequentially lowered to engage the power ring assembly 13 to start electrical generation of 2 to 10 KW each. Some embodiments will use the centrifugal ball assembly 7 to sense the speed of rotation. Other speed sensors may merely provide a permanent magnet that passes a cooperating coil and core to detect speed of rotation.

As the rotation speed of the power ring assembly 13 increases it increases the power output from the four generators 10. At this point the wind power from the Z Blades may or may not be responsible for the rotation speed unless sustained winds of 20 MPH or more are available. Should the wind suddenly drop to zero the Electro Magnetic Pulse Drive system will continue to accelerate the rotation of the Wind-Mag Generator.

When the rotation speed from the power ring assembly 13 exceeds the speed corresponding to an ambient prevailing wind 20 MPH (when the Z blades 1 encounter winds over 20 MPH) speed sensors will interrupt the voltage coming from the alternator to the Mag drive system causing the Mag-Pulse Drive to temporary stop operating and the four generators to drag the speed of the power ring down to a pre set speed comparable to the speed produced by a 20 MPH ambient wind where at this point the speed sensor will reconnect the voltage from the Alternator to the Electro Magnetic-Drive system regulating rotation speed to a maximum of corresponding to the rotational speed caused by 20 MPH ambient wind.

The operation of the alternator 21, coils 25, rare earth magnets 24 pulse distributor harness 32, magnetic pulse distributor box 33, pulse width modulator micro processor and voltage regulator 34 will be closely related to the design of stepper motors where an internal rotor containing permanent magnets or a magnetically-soft rotor with salient poles is controlled by a set of external magnets that are switched electronically. A stepper motor may also be thought of as a cross between a DC electric motor and a rotary solenoid. As each coil is energized in turn, the rotor aligns itself with the magnetic field produced by the energized field winding. Unlike a synchronous motor, in its application, the stepper motor may not rotate continuously; instead, it "steps" meaning it starts and then quickly stops again. Thus, it moves from one position to the next as field windings are energized and de-energized in sequence. Simple stepper motor drivers entirely energize or entirely de-energize the field windings, leading the rotor to "cog" to a limited number of positions. So-called quartz analog wristwatches contain the smallest commonplace stepping motors; they have one coil, draw very little power, and have a permanent-magnet rotor. The same kind of motor drives battery-powered quartz clocks.

Although the description expressly refers to materials such as 5086 aluminum, those skilled in the art will also alternative materials including but not limited to stainless steel and composites depending on environmental requirements, price points and end user requirements. The description of the preferred embodiment refers to All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean one and only one unless explicitly so stated, but rather one or more. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

LEGEND OF ELEMENT NUMBERS

Z-shaped blades 1
dish dome 3
eye bolt 4
support pipe 6
centrifugal ball assembly 7
balls 8
roller wheels 9
generators 10
supports 11
support plate 12
power ring assembly 13
power ring lip 13A
retaining angle 14
center pipe 15
openings 16
roller assemblies 17
rollers 18
power ring base 19
platform 20
alternator 21
alternator drive wheel 22
generator drive wheel 23
rare earth magnets 24
electro magnet coil assemblies 25.
Mag pulse laser drive mounting brackets 26
bracket 27
tension snubber 28
generator snubber brackets 29
bracket 30
pulse distributor harness 32
magnetic pulse distributor box 33
pulse width modulator micro processor and voltage regulator 34
outgoing generated energy junction box 35 outgoing power cable and plug outlet 36
platform pipe 37

What is claimed is:

1. A vertical axis wind turbine apparatus which comprises:
    a stationary support platform;
    a platform pipe fixed to said platform, said platform pipe having an axis;
    a power ring dimensioned and configured for rotational movement about said platform pipe and having an axis of rotation coincident with the axis of said platform pipe, said power ring including a sleeve concentric with said platform pipe, said sleeve having a plurality openings therein;
    a plurality of rollers carried on said power ring, each of said rollers extending through one of said openings and abutting said platform pipe thereby facilitating rotation of said power ring about said platform pipe; and
    a plurality of elongated blades carried on said power ring about the periphery thereof.

2. The vertical axis wind turbine as described in claim 1 wherein:
    each of said blades are disposed in substantially aligned relationship with the axis of said platform pipe.

3. The vertical axis wind turbine as described in claim 2 wherein:
    a face of each blade facing the wind has a matte finish.

4. The vertical axis wind turbine as described in claim 1 wherein:
    each of said blades has a generally Z-shaped cross-section.

5. The vertical axis wind turbine as described in claim 1 wherein:
    each of said blades has a Z-shaped cross-section characterized by a generally planar midsection having opposed flanges extending from said generally planar midsection to define the Z-shaped cross-section.

6. The vertical axis wind turbine as described in claim 5 wherein:
    the contour of the sides of the midsection of respective blades at the interface with the respective flanges thereof are substantially elliptical sections.

7. The vertical axis wind turbine apparatus as described in claim 1 wherein:
    said sleeve on said power ring includes a drive surface disposed on the upper face thereof, said drive surface being dimensioned and configured for engagement with at least one rotor of one power generation apparatus.

8. The vertical axis wind turbine apparatus as described in claim 7 wherein:
    the apparatus further includes at least a first generator having a drive wheel dimensioned and configured for engaging said drive surface on said sleeve.

9. The vertical axis wind turbine apparatus as described in claim 7 wherein:
    the apparatus further includes a plurality of generators having respective drive wheels dimensioned and configured for engaging said drive surface on said sleeve.

10. The vertical axis wind turbine apparatus as described in claim 9 wherein:
    the apparatus includes apparatus for sequentially engaging respective generators with said drive surface on said upper face of said sleeve as part of a startup sequence during which said power ring begins rotary motion and progresses to a stable operating speed.

11. The vertical axis wind turbine apparatus as described in claim 7 wherein:
    the apparatus includes an alternator having a drive wheel dimensioned configured for engaging said drive surface of said sleeve.

12. The vertical axis wind turbine apparatus as described in claim 11 wherein:
    power ring includes a plurality of electromagnets disposed thereon and said apparatus further includes a plurality of permanent magnets on stationary structure dimensioned, configured and positioned for registration with respective electromagnets as the power ring rotates.

13. The vertical axis wind turbine apparatus as described in claim 12 wherein:
    the apparatus includes a voltage regulator and a pulse width modulator conditioning the output of the alternator and sequentially directing that output to respective electromagnets on said power ring whereby rotational movement of said power ring is augmented.

* * * * *